(12) United States Patent  
Eaves et al.

(10) Patent No.: US 9,419,436 B2  
(45) Date of Patent: Aug. 16, 2016

(54) DIGITAL POWER RECEIVER SYSTEM

(71) Applicant: VoltServer, Inc., East Greenwich, RI (US)

(72) Inventors: Stephen Spencer Eaves, Charlestown, RI (US); Harry Daniel Lowe, Providence, RI (US)

(73) Assignee: VoltServer, Inc., East Greenwich, RI (US)

( * ) Notice: Subject to any disclaimer, the term of this patent is extended or adjusted under 35 U.S.C. 154(b) by 0 days.

(21) Appl. No.: 14/886,455

(22) Filed: Oct. 19, 2015

(65) Prior Publication Data

US 2016/0111877 A1    Apr. 21, 2016

Related U.S. Application Data

(60) Provisional application No. 62/066,560, filed on Oct. 21, 2014.

(51) Int. Cl.
| | |
|---|---|
| *H04L 27/00* | (2006.01) |
| *H02J 3/14* | (2006.01) |
| *H02J 3/12* | (2006.01) |
| *H04B 3/54* | (2006.01) |

(52) U.S. Cl.  
CPC .. *H02J 3/12* (2013.01); *H04B 3/542* (2013.01)

(58) Field of Classification Search  
CPC ................................. H04L 12/10; H04B 3/548  
USPC ............ 375/295, 316; 700/293, 298; 307/35, 307/125  
See application file for complete search history.

(56) References Cited

U.S. PATENT DOCUMENTS

| | | |
|---|---|---|
| 2009/0204268 A1 | 8/2009 | Eaves |
| 2012/0075759 A1 | 3/2012 | Eaves |
| 2013/0103220 A1 | 4/2013 | Eaves |
| 2015/0207318 A1* | 7/2015 | Lowe .................. H02J 13/0003 307/24 |
| 2015/0215001 A1 | 7/2015 | Eaves |

OTHER PUBLICATIONS

US Patent and TM Office, International Search Report and Written Opinion for PCT/US15/56206 (Jan. 4, 2016).

* cited by examiner

*Primary Examiner* — David S Huang  
(74) *Attorney, Agent, or Firm* — Modern Times Legal

(57) ABSTRACT

Digital power is regulated by transmitting digital power via a transmission line pair to at least one receiver circuit in a digital power receiving system. The digital power is converted into analog power in the receiver circuit. The analog power is transmitted to at least one power conditioning circuit, and output power is transmitted from the power conditioning circuit. At least one voltage in the digital power receiver system is monitored; and, in response to that monitoring, the output power from the power conditioning circuit is regulated to improve at least one of safety, efficiency, resiliency, control, and routing of power.

18 Claims, 4 Drawing Sheets

DIGITAL POWER RECEIVER SYSTEM

RELATED APPLICATION

This application claims the benefit of U.S. Provisional Application No. 62/066,560, filed 21 Oct. 2014, the entire content of which is incorporated herein by reference.

BACKGROUND

Digital electric power, or digital electricity, can be characterized as any power format where electrical power is distributed in discrete, controllable units of energy. Packet energy transfer (PET) is a new type of digital electric power protocol disclosed in U.S. Pat. No. 8,781,637 (Eaves 2012).

The primary discerning factor in a digital power transmission system compared to traditional, analog power systems is that the electrical energy is separated into discrete units; and individual units of energy can be associated with analog and/or digital information that can be used for the purposes of optimizing safety, efficiency, resiliency, control or routing.

As described by Eaves 2012, a source controller and a load controller are connected by power transmission lines. The source controller of Eaves 2012 periodically isolates (disconnects) the power transmission lines from the power source and analyzes, at a minimum, the voltage characteristics present at the source controller terminals directly before and after the lines are isolated. The time period when the power lines are isolated was referred to by Eaves 2012 as the "sample period", and the time period when the source is connected is referred to as the "transfer period". The rate of rise and decay of the voltage on the lines before, during and after the sample period reveal if a fault condition is present on the power transmission lines. Measurable faults include, but are not limited to, short circuit, high line resistance or the presence of an individual who has improperly come in contact with the lines.

Eaves 2012 also describes digital information that may be sent between the source and load controllers over the power transmission lines to further enhance safety or provide general characteristics of the energy transfer, such as total energy or the voltage at the load controller terminals. Since the energy in a PET system is transferred as discrete quantities, or quanta, it can be referred to as "digital power" or "digital electricity".

One application of a digital power distribution system is to distribute direct-current (DC) power in digital format and at elevated voltage from the source side of the system to the load side. At the load side of the power distribution system, the DC power is converted from digital format back to traditional analog DC format, using a circuit referred to as a receiver, for use in commonly available power conditioning circuits. Power conditioning circuits, widely known to the industry, take an input voltage and produce a controlled alternating-current (AC) or DC output voltage. One example is a conditioner that takes a 380V DC input and creates a 12V DC output for use in a computer. A power conditioning circuit can also convert a DC input to an AC output, as is commonly found in uninterruptable power supplies or inverters. In its most basic form, a power conditioner is a simple switch that either allows or inhibits current flow.

SUMMARY

A digital power receiver system and a method for regulating digital power are described herein, where various embodiments of the apparatus and methods may include some or all of the elements, features and steps described below.

A digital power receiver system supplied by a digital power distribution system, comprises one or more individual receiver circuits that are each connected to an individual transmission line pair originating from a digital power transmission source and where the one or more individual receiver circuits are configured to convert the digital power on the transmission line pair to analog power; one or more receiver output bus segments that electrically connect groups of the one or more individual receiver circuits in parallel; one or more power conditioning circuits configured to connect to the one or more individual receiver circuits or to the one or more receiver output bus segments; one or more power conditioning circuit output bus segments that electrically connect the output terminals of the one or more power conditioning circuits to provide a combined power output; and a control circuit that is operable to monitor at least one voltage within the digital power receiver system and to act to regulate output power of at least one power conditioning circuit to improve at least one of safety, efficiency, resiliency, control and routing of power.

A method for regulating digital power comprises transmitting digital power via a transmission line pair to at least one receiver circuit in a digital power receiving system; converting the digital power into analog power in the receiver circuit; transmitting the analog power to at least one power conditioning circuit; transmitting output power from the power conditioning circuit; monitoring at least one voltage in the digital power receiver system; and in response to that monitoring, regulating the output power from the power conditioning circuit to improve at least one of safety, efficiency, resiliency, control, and routing of power.

Figure 1:
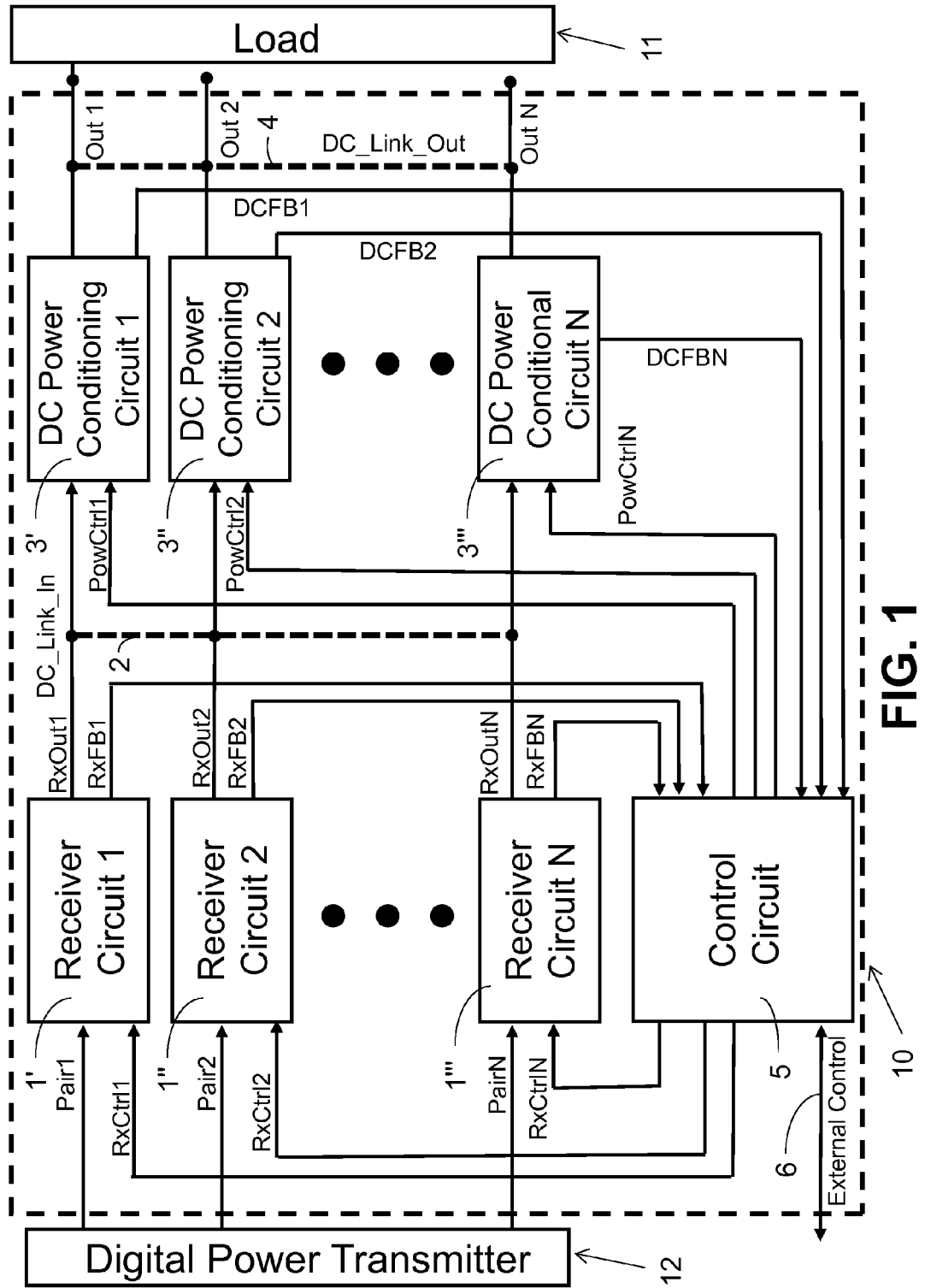
FIG. 1 is a block diagram of a digital power receiving system.

In the accompanying drawings, like reference characters refer to the same or similar parts throughout the different views; and apostrophes are used to differentiate multiple instances of the same or similar items sharing the same reference numeral. The drawings are not necessarily to scale; instead, an emphasis is placed upon illustrating particular principles in the exemplifications discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

More specifically, disclosed herein is a novel combination of traditional power conditioning circuitry and digital power receiver circuits that can improve or optimize factors of safety, efficiency, resiliency, control and routing of power, and that can prioritize digital power delivery across multiple loads based on a predetermined priority scheme.

In many cases, to support higher power levels or to offer redundancy, multiple transmission pairs are combined in parallel. One difficulty that arises when power-limited circuits are combined in parallel is that the individual circuits do not always share the total load equally due to minor variances in circuit impedance. Reasons for variances in circuit impedance may include differences in transmission pair cross-sectional diameter at the same length and/or differences in transmission pair lengths.

A second difficulty is the proper synchronization of the circuits during start-up. For example, consider a two circuit system that must power a total of 200 W but where any individual circuit is power limited to 100 W. If one of the two circuits starts up before the other, it will momentarily need to support all of the load requirements (i.e., 200 W). This load exceeds the circuit's 100 W maximum capacity, resulting in a shut-down of the circuit due to the over-power, non-compliant condition. Circuits configured to automatically reset would typically wait from 1 to 60 seconds before retrying the power-up sequence. While the first circuit is waiting to retry, the second circuit will come on-line and, in turn, try to support the entire 200 W load and, in turn, shut down because of the over-power, non-compliant condition. If there is no synchronization of the digital power circuits, the faulty start-up sequence may continue indefinitely.

Yet a third difficulty arises when responding to the failure of an individual circuit that is part of a larger parallel group. In many instances, the circuits are supplying loads that have priority levels associated with them. For example, a supply circuit that is powering a heart pump should have priority over one that is supplying general lighting in a hospital. When an individual circuit fails, it would be advantageous to have a prearranged prioritization scheme that would determine which loads will receive a reduced allocation of power. Moreover, the prioritization scheme would ideally be configurable by an outside host system. One method to allow an outside host system to configure the prioritization scheme is through the implementation of what is commonly known in the industry as an Application Programming Interface (API).

Disclosed herein is an architecture that can address the above-discussed difficulties economically and reliably and that can support a wide range of parallel digital power circuits ranging from one to dozens in parallel. Additionally, as will be described below, the communications features of the PET protocol described in Eaves 2012 are leveraged to implement optimized combinations of safety, efficiency, resiliency, control or routing, and to allow priority levels to be set on the delivery of power to multiple loads.

A block diagram of a digital power receiver system 10 is shown in FIG. 1. This system includes a digital power receiver configured to operate with packet energy transfer (PET) protocol. Packet energy transfer and, more specifically, the transmitter source of power is described in Eaves 2012. One or more receiver circuits 1 each have a transmission line pair (Pair1, Pair2, PairN) originating from the PET transmission source 12. Individual receiver circuit outputs can be combined in parallel on electrical receiver output bus (DC_Link_In) 2. The DC input terminals of one or more DC power conditioning circuits 3 are tied to available segments of DC_Link_In 2. The individual outputs of the power conditioning circuits 3 can be combined in parallel or operated separately by connecting or disconnecting segments of the power conditioning circuit output bus (DC_Link_Out) 4. The operation of the receiver circuits 1 and power conditioning circuits 3 is managed by control circuit 5. The control circuit 5 obtains feedback on the operation of the receiver and power conditioning circuits 1 and 3 through feedback line groups, RxFB1, RxFB2, RxFBN, DCFB1, DCFB2, DCFBN. The control circuit 5 is analogous to the load controller described in Eaves 2012 with the difference being that it manages multiple transmission line pairs versus only one pair in Eaves 2012. The control circuit 5 can be a fully functional processor executing the necessary algorithms to prioritize the allocation of energy to the various power conditioning circuits 3 and optimizing safety, efficiency, resiliency, control and routing. In other embodiments, the control circuit 5 can be a simplified version executing commands for operation originating from a remote processing device.

Overall, control circuit 5 can monitor the availability of power from each receiver circuit 1 to determine if, how many, and at what power level each of the DC power conditioning circuits 3 will be operated. As discussed in the background section, for operation of parallel connected groups, multiple receiver circuits 1 are synchronously activated to deliver power, or one or more of the receiver channels can overload as the load devices 11 attached to the DC power conditioning circuit 1 outputs begin drawing power. Control circuit 5 can control the rate of power transfer in each of the power conditioning circuits 3 through control line groups, including a first power controller (PowCtrl1), a second power controller (PowCtrl2), up to an Nth power controller (PowCtrlN).

Figure 2:
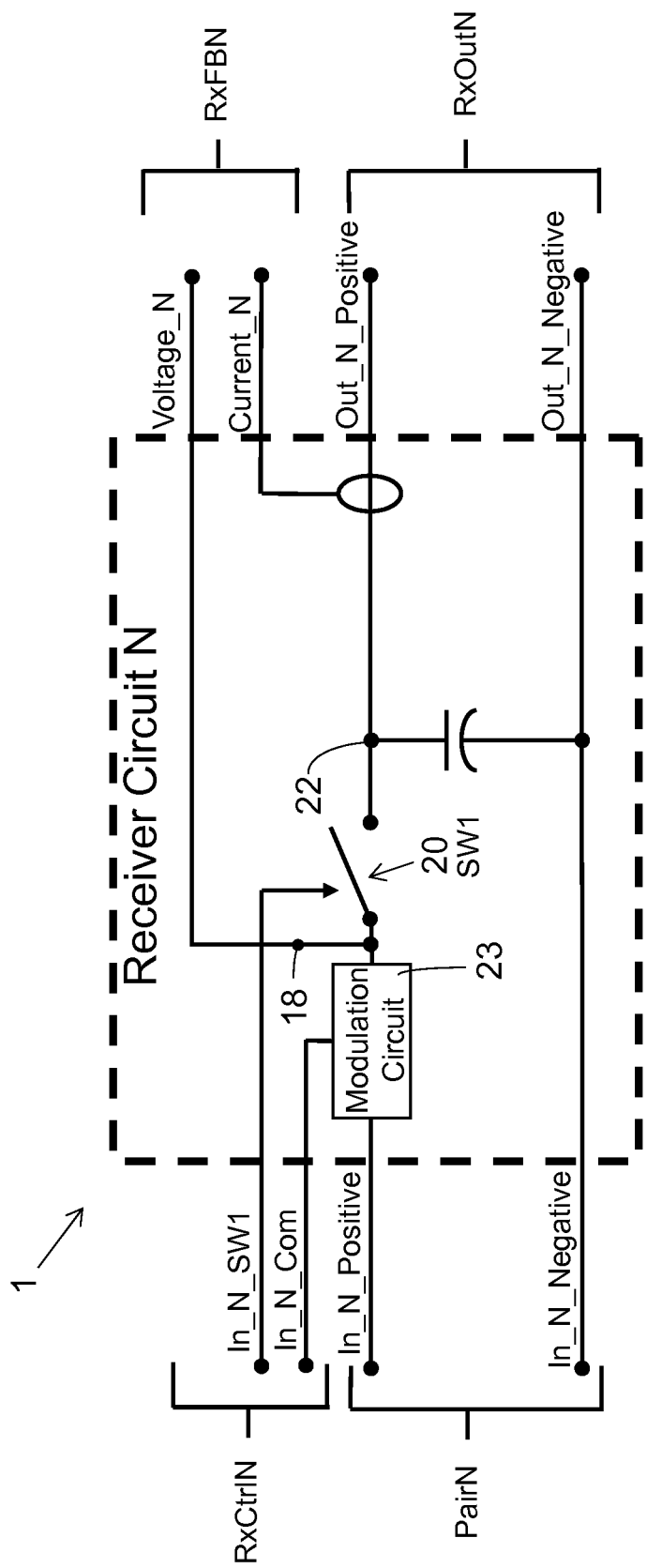
FIG. 2 is a block diagram of an embodiment of a receiver circuit.
Figure 3:
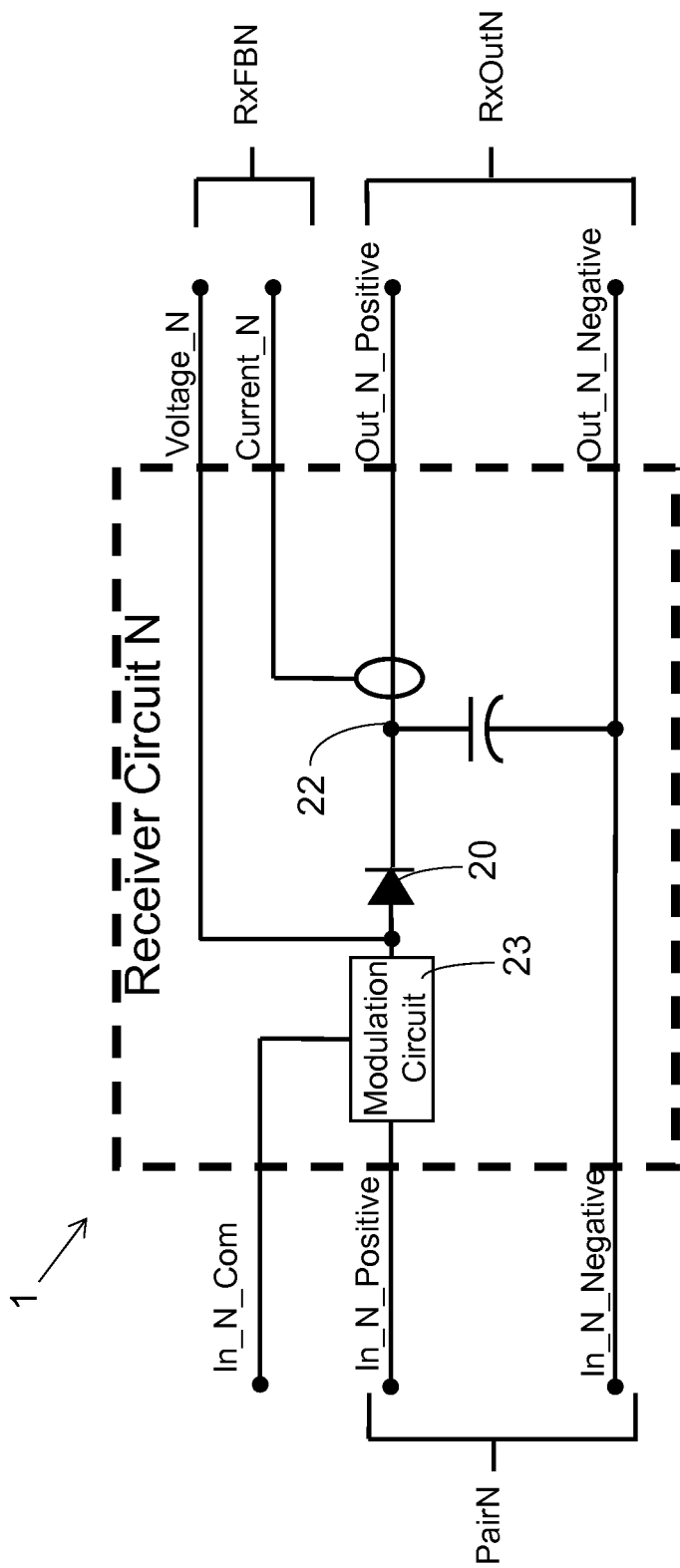
FIG. 3 is a block diagram of an embodiment of a receiver circuit including a switch in the form of a simple diode 20.

An embodiment of a receiver circuit 1 is shown in FIG. 2. Switch SW1 20 controls electrical current flow into the receiver circuit 1. SW1 20 can be in the form of controllable switches (electro-mechanical or solid-state electronic) as shown in FIG. 2; or it may be a simple diode as depicted in FIG. 3. The receiver circuits 1 convert the digital power on the conductor pair back to conventional analog electricity that no longer comprises discrete units or pulses. This conversion is performed by rectification, either actively (using a controllable switch) or passively (using a diode). The rectification is performed by SW1 20, which inhibits current flow from a receiver DC link 22 back into the receiver conductor pair when the digital power source 12, or transmitter, terminates an energy pulse. The transmitter 12 terminates the energy pulse by opening its own switch (making the switch non-conducting) on the transmitter side of the system. At this point the transmission pairs are electrically isolated from both the transmitter and the receiver, allowing at a minimum, the transmitter 12 to analyze the receiver conductor pair to determine if the voltage decay is within predetermined parameters, as described in Eaves 2012.

SW1 20 can comprise a bi-directional switch that can control current flow in either direction. The receiver circuits 1 can then be combined with bi-directional power conditioning circuits 3. This allows power to flow in reverse from the output of the power conditioning circuits 3, back through the receiver circuits 1 and into the transmission line pairs. This ability is useful in cases where the load 11 can reverse roles and become a source of energy. For example, where the digital power receiver system 10 is feeding a home at night, the home can have photovoltaic solar panels that provide an excess of power that can be sent back through the digital power receiver system 10 to be sold back to the utility. In another embodiment, an energy storage device, such as a battery, is positioned to receive the output of one or more of the power conditioning circuits 3. The battery can be charged at one instance, but then can be later discharged back into the digital power receiver system 10. The digital power receiver system 10 can execute a routing algorithm where a portion of the energy in the energy storage device is sent via the transmission lines back to the transmission source 12, and the remainder of the energy from the storage device is distributed according to a priority scheme to the various power conditioning circuits 3', 3", and 3'" in the system 10.

The control circuit 5 can send communications signals via the receiver control line group, RxCtrl1 RxCtrl2, RxCtrlN, to the receiver modulation circuit 23 of FIG. 2. The modulation circuit 23, using techniques commonly known to the industry, can superimpose and modulate a communication signal on the transmission line pair, PairN. The modulated signal can, in turn, be demodulated at the corresponding transmitter source controller, as detailed in Eaves 2012. The transmitter source controller can then be instructed to turn on, turn off, or set limits on the output power, voltage or current available on the transmission line pair.

An example for the use of the communications capability is where the control circuit 5 communicates back to each of the transmitter source controllers; notifying them that they are all providing power to the same digital power receiver system 10. In this way, the individual transmitter controllers can act to balance power flow to all of the involved transmission line pairs or, according to a preconfigured prioritization scheme, allow a higher power limit to one pair versus another. A further example is where a receiver controller acquires a receiver circuit voltage, such as at point 18 of FIG. 2, or power conditioning circuit voltage, such as at point 27 of FIG. 4, and communicates the value to one or more transmitter controllers. The controllers then adjust their average output to regulate the voltage at the receiver according to a predetermined set point. The receiver controller can accomplish a similar result by periodically sending a command to the transmitter controllers that direct the controllers to increase or decrease their average output voltage in order to maintain a predetermined voltage set point at the receiver. Among other methods, average output voltage variation can be achieved by adjusting the duty cycle of the transfer period versus sample period of the PET waveform, as described in Eaves 2012.

Without communicating back to the corresponding transmitter controllers, the control circuit 5 has the capability to sense if a receiver circuit 1 is ready to deliver power by acquiring the voltage at the receiver input at point 18 of FIG. 2 and determining if it has reached a predetermined minimum value. The controller can wait until a minimum number of receiver circuits 1', 1", and/or 1'" are ready to deliver power before enabling one or more power conditioning circuits 3', 3", and/or 3'" via the control line groups, PowCtrl1, PowCtrl2, PowCtrlN. Alternatively, if only a limited number of receiver circuits 1', 1", and/or 1'" are ready to deliver power, the control circuit 5 can be configured to distribute the available power to the power conditioning circuits 3', 3", and/or 3'" according to a prearranged prioritization scheme. In this case, DC_Link_Out 4, shown as the dotted line in FIG. 1, is removed from at least one of the power conditioning circuits 3', 3", and/or 3'" to allow the power conditioning circuit 3'/3"/3'" to deliver power to a load 11 individually. The prioritization scheme can be locally programmed in the controller or can be programmed remotely from the transmitter controllers via the modulation circuits in the receiver circuits 1.

Yet another method to allocate available power from the receiver circuits 1 to the power conditioning circuits 3 is to measure voltage and/or current at individual power conditioning circuits 3', 3", and 3'" via DC feedback line groups, DCFB1, DCFB2, DCFBN, and limit the amount of power or energy that can be provided by a power conditioning circuit 3 based on the prioritization scheme using power conditioner control line groups, PowCtrl1, PowCtrl2, PowCtrlN. For example, DC power conditioning circuit 3', 3", or 3'" can be supplying a heart pump charger and is enabled as soon as the minimum number of receiver circuits 1', 1", and/or 1'" for its individual load requirement are satisfied and before any other power conditioning circuit 3', 3", or 3'" is enabled. One should note that there may be different settings for the minimum number of available receiver circuits 1 for enabling a power conditioning circuit 3 versus disabling a power conditioning circuit 3, including allowing operation of power conditioning circuits 3 as long as just one receiver circuit 1', 1", or 1''' is available to deliver power. An additional example is the case where a conductor pair can be configured to support an initially high current for a device with high in-rush current requirements but would later be configured to limit current to a lower level for the most efficient operation.

Figure 4:
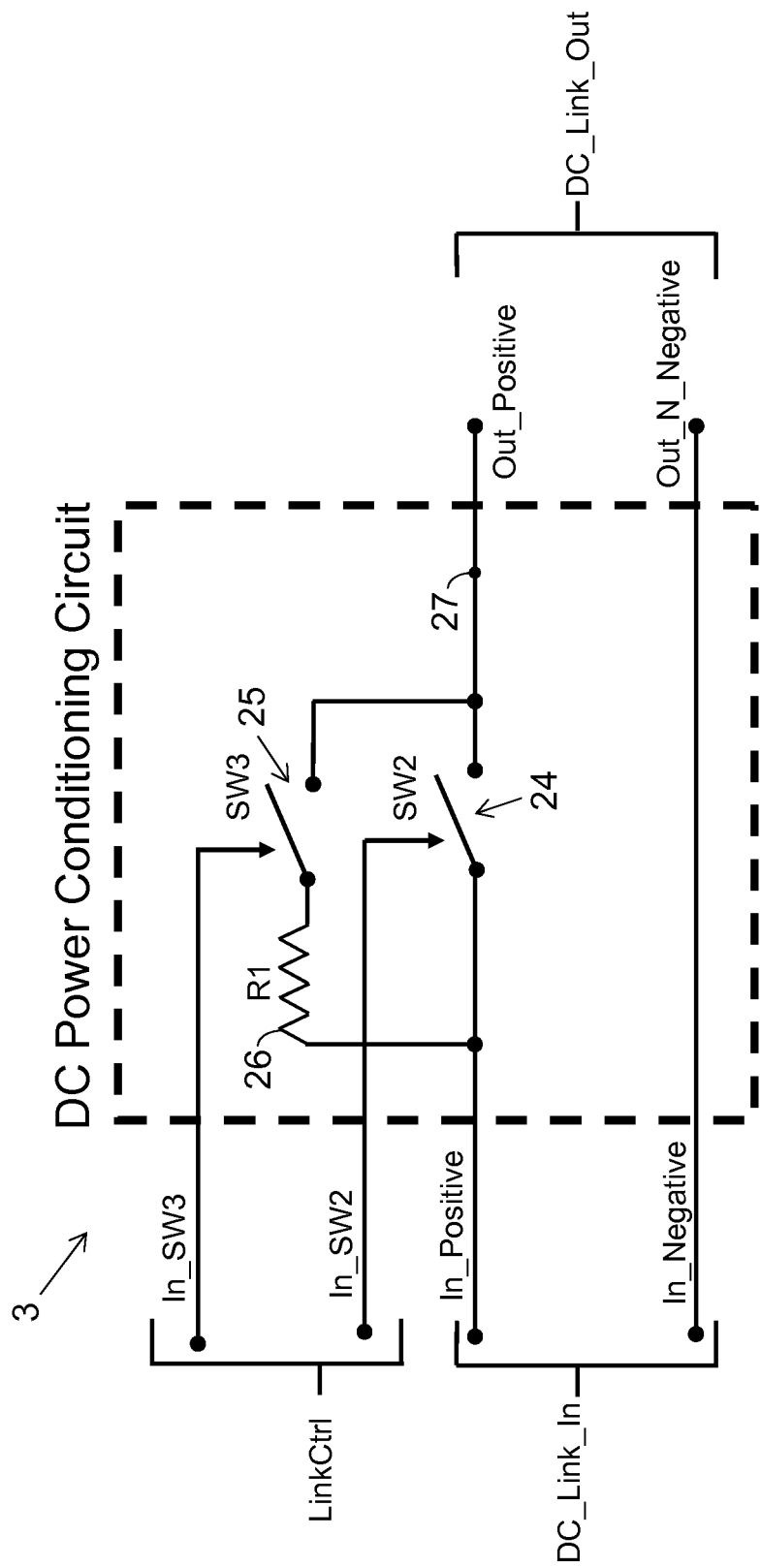
FIG. 4 is a block diagram of an embodiment of a DC power conditioning circuit.

In the embodiment of the DC power conditioning circuit 3 depicted in FIG. 4, a second switch (SW2) 24 and a third switch (SW3) 25 comprise transistor switches. In this case, control circuit 5 keeps SW2 24 and SW3 25 in an open (non-conducting state) until the receiver input voltages, as provided by RxFB1, RxFB2, RxFBN, reach a minimum value that indicates that the receiver channels are fully initialized and ready to deliver power. When a minimum number of receiver circuits 1 are ready to provide power, the control circuit 5 will act to close (place into a conducting state) SW3 25. SW3 25 connects the receiver circuits 1 to the output of the DC power conditioning circuit 3 through a series resistor, R1 26. R1 26 limits the current flow when charging the input capacitance that can be part of a load device 11 attached to the output bus, DC_Link_Out 4. The action of R1 26 and SW2 24 are commonly referred to in the industry as a pre-charge circuit. After the pre-charge time has expired, a direct connection to the load device 11 is made by closing the second switch, SW2 24 and then opening the third switch, SW3 25. Thus, the receiver circuits 1 are simultaneously engaged and able to provide a substantial pulse power capability.

Referring back to FIG. 1, the external control channel 6 allows additional sensor signals or communication signals from an external device to be acquired by the control circuit 5. For example, the external control channel 6 can include an external temperature sensor, an ambient light sensor, or a serial communications stream. The external control channel 6 can be offered as a third-party interface. For example, the digital power receiver system 10 can be part of a LED lighting fixture; and the manufacture of the fixture may wish to send data on ambient light conditions back over the transmission line pairs to the transmission source 12 and may also wish to send control signals out though external control channel 6 to set the dimming level of the LED fixture. External control channel 6 can also be connected to a corresponding "communication link" in the transmission source controller, as described in Eaves 2012. This connection can avoid the necessity to communicate to the transmitter source controller via modulation of the transmission line pairs, as described above.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $\frac{1}{100}$th, $\frac{1}{50}$th, $\frac{1}{20}$th, $\frac{1}{10}$th, $\frac{1}{5}$th, $\frac{1}{3}$rd, $\frac{1}{2}$, $\frac{2}{3}$rd, $\frac{3}{4}$th, $\frac{4}{5}$th, $\frac{9}{10}$th, $\frac{19}{20}$th, $\frac{49}{50}$th, $\frac{99}{100}$th, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A digital power receiver system supplied by a digital power distribution system, comprising;
   one or more individual receiver circuits that are each connected to an individual transmission line pair originating from a digital power transmission source and where the one or more individual receiver circuits are configured to convert digital power on the transmission line pair to analog power;
   one or more receiver output bus segments that electrically connect groups of the one or more individual receiver circuits in parallel;
   one or more power conditioning circuits configured to connect to the one or more individual receiver circuits or to the one or more receiver output bus segments;
   one or more power conditioning circuit output bus segments that electrically connect output terminals of the one or more power conditioning circuits to provide a combined power output; and
   a control circuit that is operable to monitor at least one voltage within the digital power receiver system and to act to regulate output power of at least one power conditioning circuit to improve at least one of safety, efficiency, resiliency, control and routing of power.

2. The digital power receiver system of claim 1, wherein the control circuit is configured to send or receive information over the transmission line pairs by superimposing a communication signal onto the transmission line pairs.

3. The digital power receiver system of claim 2, wherein an external device is configured to provide a signal that causes the control circuit to superimpose the communication signal onto the transmission line pair.

4. The digital power receiver system of claim 2, wherein the control circuit is configured to acquire at least one receiver voltage within the digital power receiver system and to communicate the receiver voltage over the transmission line pair so that the transmission source can adjust its average transmission voltage to regulate the receiver voltage to a predetermined value.

5. The digital power receiver system of claim 2, wherein the control circuit is configured to acquire at least one receiver current within the digital power receiver system and to communicate the receiver current over the transmission line pair so that the transmission source can adjust its average transmission voltage to regulate an output current from the digital power receiver system to a predetermined value.

6. The digital power receiver system of claim 1, wherein the control circuit is configured to monitor an internal voltage of at least one of the one or more receiver circuits and to limit the power output of one or more power conditioning circuits until the internal voltage reaches a predetermined value, to ensure that a predetermined minimum amount of power is available from the transmission line pairs supplying the one or more receiver circuits, before allowing the one or more receiver circuits to operate at increased power.

7. The digital power receiver system of claim 1, wherein the one or more power conditioning circuits are configured to limit the electrical current flow to prevent an overcurrent condition in the one of more receiver circuits.

8. The digital power receiver system of claim 1, wherein the control circuit is configured to regulate the output power level on the one or more power conditioning circuits based on a predetermined operational scheme.

9. A method for regulating digital power, comprising:
transmitting digital power via a transmission line pair to at least one receiver circuit in a digital power receiving system;
converting the digital power into analog power in the receiver circuit;
transmitting the analog power to at least one power conditioning circuit;
transmitting output power from the power conditioning circuit;
monitoring at least one voltage in the digital power receiver system; and
in response to that monitoring, regulating the output power from the power conditioning circuit to improve at least one of safety, efficiency, resiliency, control, and routing of power.

10. The method of claim 9, wherein a plurality of safety, efficiency, resiliency, control, and routing of power are improved by the regulation of power.

11. The method of claim 9, further comprising using a receiver control circuit to send or receive information over the transmission line pair by superimposing a communication signal onto the transmission line pair.

12. The method of claim 11, further comprising using a signal from an external device to cause the receiver control circuit to superimpose the communication signal onto the transmission line pair.

13. The method of claim 11, further comprising:
acquiring at least one receiver voltage within the digital power receiving system;
communicating the receiver voltage over the transmission line pair to a transmission source that generates the digital power; and
adjusting an average transmission voltage of the digital power generated by the transmission source in response to the receiver voltage to regulate the receiver voltage to a predetermined value.

14. The method of claim 11, further comprising:
acquiring at least one receiver current within the digital power receiving system;
communicating the receiver current over the transmission line pair to a transmission source that generates the digital power; and
adjusting an average transmission voltage of the digital power generated by the transmission source in response to the receiver current to regulate the output current from the digital power receiver system to a predetermined value.

15. The method of claim 9, further comprising:
monitoring an internal voltage of the at least one receiver circuit;
limiting the output power from the power conditioning circuit; until the internal voltage reaches a predetermined value that ensures that a predetermined minimum amount of power is available from the transmission line pair; and
when the internal voltage reaches the predetermined value, operating the at least one receiver circuit at increased power.

16. The method of claim 9, wherein the power conditioning circuit limits electrical current flow to prevent an overcurrent condition in the receiver circuit.

17. The method of claim 9, wherein the power conditioning circuit regulates the output power from the power conditioning circuit based on a predetermined operational scheme.

18. The method of claim 9, wherein the regulation of the output power from the power conditioning circuit prevents a receiver channel from overloading due to power draw from at least one load device attached to the power conditioning circuit.

* * * * *